Figure 1:
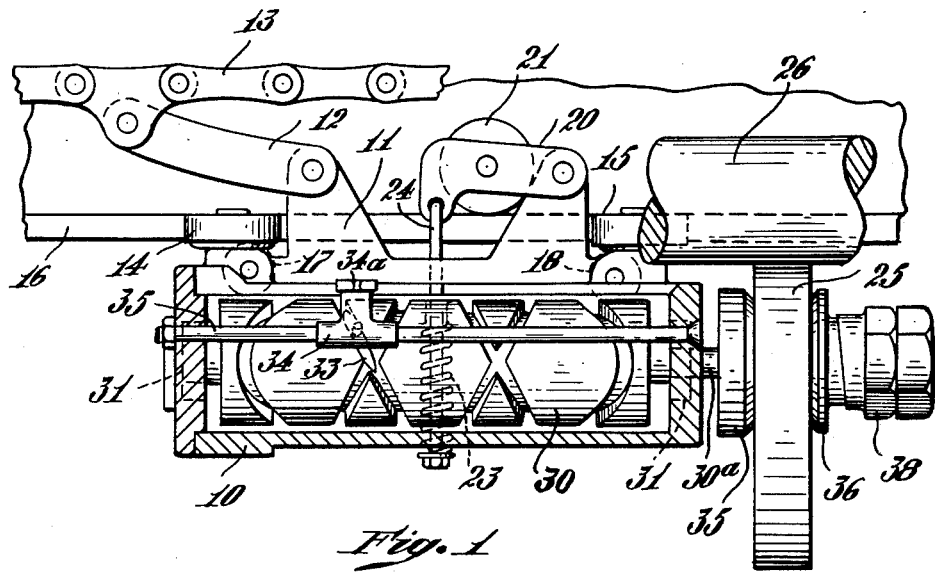

July 14, 1964 — S. L. ABBOTT — 3,140,836

WINDING MACHINE

Original Filed April 11, 1957

United States Patent Office 3,140,836
Patented July 14, 1964

3,140,836
WINDING MACHINE
Samuel L. Abbott, Wilton, N.H., assignor to Abbott Machine Co., Inc., Wilton, N.H., a corporation of New Hampshire
Original application Apr. 11, 1957, Ser. No. 652,268, now Patent No. 3,091,406, dated May 28, 1963. Divided and this application Dec. 19, 1962, Ser. No. 246,658
5 Claims. (Cl. 242—18.1)

This application is a division of application Serial No. 652,268, filed April 11, 1957, now Patent No. 3,091,406.

This invention relates to winding machines of the type in which the winding unit includes yarn traversing means and a tire for driving the traversing means. Machines of this type are disclosed in United States Patent No. 2,135,485.

The present invention provides improved means for causing a continual variation in speed of the traversing means for the purpose of preventing the occurrence of "ribbon winding."

In machines of the type disclosed in said patent the traverse cam of the traveling winding unit, carrying one or more tires fast thereon, has been caused to vary in speed by means of a wavy contour of the non-traveling drive roll, for this purpose of preventing "ribbon winding." With that arrangement the tire or tires would be driven at a high speed when in contact with a larger diameter portion of the non-traveling drive roll and at a slower speed when in contact with a smaller diameter portion of the roll, and the speed of the traverse cam would vary accordingly. The winding package would be driven at a substantially constant speed because it was continually in contact with at least one crest or maximum diameter portion of the drive roll. This arrangement is shown in an exaggerated scale in FIG. 25 of the above patent.

Naturally when for any reason the travel of the winding units was suspended, the traverse cams of the units would each be driven at some constant speed, and any winding package which was at any of the various critical stages of winding would be subject to "ribbon winding."

Even when the winding units are traveling along the wavy roll the variation in speed is not as continuous as desired. To drive the traverse cam efficiently a tire of substantial width, for example five-eighths inch, is needed. The crests of the wavy roll are substantially flat for a length of approximately one-half inch. Moreover the tire tends to be driven by its leading edge as it approaches a crest and tends to be driven by its trailing edge as it leaves the crest. This combination of circumstances results in there being at each crest a zone of about one and one-half inches in which there is little change in speed of the tire. It would be desirable to avoid these periodic suspensions of the speed-varying action, and to be able to select the pattern of speed change without the limitations which are imposed by the wavy roll and tire combination.

While a somewhat wavy roll could rotate the winding packages at a substantially constant speed, it would have been better in some instances to have been able to drive the winding packages from a perfectly cylindrical drive roll, so as to have them rest with equal pressure along the line of contact of the package and drive roll rather than rest more heavily upon the crests of the wavy roll.

The invention in one aspect aims to improve upon the previous construction and to avoid its disadvantages.

More particularly an object of the invention is to provide an improved connection between the tire and yarn traversing means, which connection automatically varies the speed of the traversing means relative to the tire. This avoids the necessity for relying upon a wavy contour of the non-traveling drive roll. This also continues the ribbon-breaking variation of speed ratio between winding speed and traversing speed while the winding units are not traveling.

Figure 2:
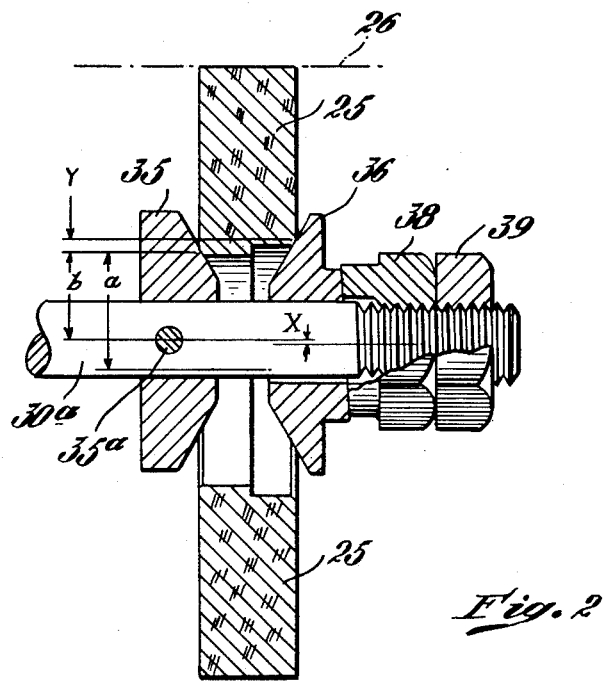

In the accompanying drawings,

FIG. 1 is a view in the nature of a plan of a head of a traveling winding unit and a portion of the package drive roll, but with parts removed and broken away to expose the yarn traversing means of the winding unit; and FIG. 2 is a sectional view showing the tire and the cooperating members driven thereby, taken in the plane of the axis of the traverse cam shaft and the axis of the package drive roll.

As in usual traveling spindle winders the head includes a box-like casing 10 carrying a bracket 11 which is connected by a drag link 12 to a traveling chain 13. Wheels 14 and 15 support the head upon the upper flange of a rail 16. Wheels 17 and 18 are at a level to engage the outer face of rail 16. An arm 20 pivoted to bracket 11 carries a roll 21 engaging the inner face of rail 16 and a spring 23 reacts on the head and upon a link 24 connected to arm 20, so as to pull the head in toward the rail. Wheel 17 at the left of the unit is thus held against rail 16. Wheel 18 does not engage the rail 16 at the portions of the course of travel at which the package drive rolls are present, because at the right side of the head a tire 25 carried by the head bears against the package drive roll 26, being held in firm driven engagement therewith by the force of the spring 23.

A groove traverse cam 30 rotates in bearings 31 in the ends of casing 10 and operates a cam follower 33 to reciprocate a thread guide slider 34 upon a rod 35. The cam 30 is preferably formed of nylon so as to be light and have much less inertia than a metal cam, thereby to respond quickly to changes in driving speed. The slider has a notch 34a in which the winding yarn is carried.

The traverse cam shaft 30a, upon which the traverse cam is fast, extends out the right side of the head shown in FIG. 1 and carries the driving structure of the present invention and which is shown in greater detail in FIG. 2 of the drawings.

The inner peripheral edges of the cork tire 25 are slightly beveled and in the region toward the roll 26 these inner peripheral edges engage and drive two pulley halves 35 and 36 which together form a V pulley. The tire 25 is of sufficiently large internal diameter so that it is in driving engagement with the pulley halves only in the region toward the drive roll 26. The distance $a$ is the radial distance from the point of drive of the pulley half 35 to the axis of the tire and the distance $b$ is the radial distance from the point of drive to the axis of the cam shaft. It may readily be seen that pulley half 35 will be driven at $a/b$ times the speed of the tire, which in the illustrated construction is in the region of 1⅓ times the speed of the tire.

The relation between pulley halves 35 and 36 and tire 25 is such that pulley halves 35 and 36 are driven at different speeds by the tire. This difference in speeds at which the pulley halves are driven can be obtained as follows.

First, assuming for simplicity that both pulley halves are driven by portions of the tire having the same radius, then if the axis of rotation of pulley half 36 is substantially displaced from the axis of the cam shaft in a direction away from the point at which pulley half 36 is driven, due to this pulley half being oversize upon the cam shaft, as shown, the other pulley half 35 being concentric with the cam shaft, this increases the radius of that portion of pulley half 36 which is engaged by the tire over the radius of that portion of pulley half 35 which is engaged by the tire and so causes pulley half 36 to be rotated more slowly than pulley half 35.

Second, whether or not the pulley half 36 is oversize upon the cam shaft, if the radius of that portion of the tire which engages the pulley half 36 is larger than the radius of that portion of the tire which engages the pulley half 35, due to the contour of the tire, this also causes pulley half 36 to be rotated more slowly than pulley half 35.

In either case the relations between the pulley halves and the tire are such that the radius of drive of one pulley half is greater than that of the other pulley half, and the pulley half having the greater radius of drive is driven more slowly than the other pulley half. By "radius of drive" is meant the radius of that portion of the pulley half which is engaged by the tire.

Not only can the desired difference in speed be secured in either of the above ways, but the two ways may supplement each other. Thus in FIG. 2 the radius of drive of pulley half 36 is greater than that of pulley half 35 both because (1) the axis of pulley half 36 is substantially displaced by the distance $x$ from the axis of the cam shaft because of this pulley half being oversize upon the cam shaft and (2) the radius of that portion of the tire which engages pulley half 36 is larger by the distance $y$ than the radius of that portion of the tire which engages the pulley half 35, due to the contour of the tire.

It might be thought that no differential effect would be obtained by driving pulley half 36 at an increased radius from the cam shaft axis when this increase is accompanied by equal increase in radius of that portion of the tire which engages this pulley half, because increase in radius of an interior portion of the tire is accompanied by increase in surface speed of that portion of the tire. However it can be shown that such differential effect is secured. As indicated above the speed of pulley half 35 is represented by $a/b$ times the speed of tire 25. Assuming for simplicity that pulley half 36 is concentric on the cam shaft and that the radius of that portion of the tire which engages pulley half 36 is larger by the distance $y$ than the radius of that portion of the tire which engages pulley half 35, then the speed of pulley half 36 is represented by $$\frac{a+y}{b+y}$$

times the speed of the tire. The ratio of the speed of pulley half 36 relative to the speed of pulley half 35 is then $$\frac{\frac{a+y}{b+y}}{\frac{a}{b}}$$

When $a$ is ¾ inch, $b$ is 9/16 inch and $y$ is 1/16 inch then this ratio of the speed of pulley half 36 relative to the speed of pulley half 35 becomes $$\frac{1.30}{1.33}$$

Pulley half 35 is pinned to shaft 30a by a pin 35a and thus drives the shaft and traverse cam. Pulley half 36 is rotatable and slidable axially on the shaft. Because of the difference between the speeds at which the two pulley halves are driven by the tire, there is a slow relative rotation of the pulley half 36 relative to the shaft.

A collar 38, which is threaded on the shaft and locked by a nut 39 so as to rotate with the shaft, bears against the right face of pulley half 36.

The left face of collar 38 or right face of pulley half 36, or each of these faces, as shown, is developed as a cam surface exerting an axially camming action. Thus during part of the cycle of a complete rotation of the pulley half 36 relative to the collar 38, the cam action forces pulley half 36 to the left, and during the remainder of the cycle the pulley half 36 is returned toward the right by the pressure thereon of the tire 25.

The V-pulley thus continually widens and narrows and tire 25 drives pulley half 35 and traverse cam at a varying speed. This prevents any continued laying of the coils of winding yarn in the form of an objectionable ribbon pattern.

With the improved construction it is no longer necessary for the drive roll 26 to have a wavy contour, and this roll can be entirely cylindrical, thus improving the evenness of contact of the roll and the winding package. The "ribbon breaking" action takes place continually whether the winding unit is traveling or is stationary.

The collar 38 and lock nut 39 may be adjusted on the cam shaft to shift the pulley half 36 to the left to compensate for wear of the tire. The distances $a$ and $b$ then each increase, but this increase is only of the same order as the continual change of these distances in the continual ribbon-break action and is not such as to make any important change in the general or average angle of wind of the yarn on the winding package.

For example, if by reason of the tire having become ⅛ inch thinner, the pulley half 36 is shifted to cause the point of drive of pulley half 35 to be ⅛ inch farther from the cam shaft axis than in the previous example, the ratio $a/b$ instead of being 1.33 becomes 1.27. The average speed of the traverse cam however would not decrease as much as indicated by the change from 1.33 to 1.27 because wear of the tire reduces its diameter, which causes it to rotate faster.

Adjustments of the average transverse cam speed may be obtained by substituting tires having the same or approximately the same thickness as the standard thickness but having both inside and outside diameters either increased or decreased. It can be shown by calculation that if both inside and outside diameters are increased the same amount, keeping the thickness of the tire the same, the resulting reduction in speed of the tire will be more than offset by increase in ratio between the speed of pulley half 35 and that of the tire, so that the speed of the traverse cam is increased.

I claim:

1. A winding machine of the type in which a winding unit includes yarn-traversing means and a tire for driving the traversing means, characterized by two members rotated by the tire and together forming a V-pulley, the radius of that portion of one member which is engaged by the tire being substantially greater than the radius of that portion of the other member which is engaged by the tire so that said members are rotated at substantially different speeds, one of said members being connected to drive the traversing means, and means actuated by the differential in speed between said members for causing an axial shift of one of the members relative to the other to periodically vary the speed of the traversing means.

2. A winding machine of the type in which a winding unit includes yarn-traversing means and a tire for driving the traversing means, characterized by two members rotated by the tire and together forming a V-pulley, the axis of rotation of one member being substantially displaced from the axis of rotation of the other member so that the radius of that portion of one member which is engaged by the tire is substantially greater than the radius of that portion of the other member which is engaged by the tire and said members are rotated at substantially different speeds, one of said members being connected to drive the traversing means, and means actuated by the differential in speed between said members for causing an axial shift of one of the members relative to the other to periodically vary the speed of the traversing means.

3. A winding machine of the type in which a winding unit includes yarn-traversing means and a tire for driving the traversing means, characterized by two members rotated by the tire and together forming a V-pulley, the radius of that portion of the tire which engages one member being substantially greater than the radius of that portion of the tire which engages the other member so that the radius of that portion of one member which is engaged by the tire is substantially greater than the radius of that portion of the other member which is engaged by the tire and said members are rotated at substantially different speeds, one of said members being connected to drive the traversing means, and means actuated by the differential in speed between said members for causing an axial shift of one of the members relative to the other to periodically vary the speed of the traversing means.

4. A winding machine of the type in which a winding unit includes yarn-traversing means and a tire for driving the traversing means, characterized by two members rotated by the tire and together forming a V-pulley, the axis of rotation of one member being substantially displaced from the axis of rotation of the other member and the radius of that portion of the tire which engages one member being substantially greater than the radius of that portion of the tire which engages the other member so that the radius of that portion of one member which is engaged by the tire is substantially greater than the radius of that portion of the other member which is engaged by the tire and said members are rotated at substantially different speeds, one of said members being connected to drive the traversing means, and means actuated by the differential in speed between said members for causing an axial shift of one of the members relative to the other to periodically vary the speed of the traversing means.

5. A winding machine of the type in which a winding unit includes yarn-traversing means and a tire for driving the traversing means, characterized by a rotatable member interposed between the tire and the traversing means, for receiving driving force from the tire and transmitting driving force to the traversing means, the radius of that portion of the tire that engages said member being substantially greater than the radius of that portion of said member engaged by the tire so that said member is driven at a greater angular velocity than that of the tire, a second rotatable member engaged by the tire, the radius of that portion of the tire which engages the second member being substantially greater than the radius of that portion of the tire which engages the first-named member so that said second member is driven at a lower angular velocity than that of the first-named member, said two members together forming a V-pulley, and means actuated by the differential in speed between said members for causing an axial shift of one of the members relative to the other to periodically vary the speed of the traversing means.

References Cited in the file of this patent
UNITED STATES PATENTS
2,216,725    Abbott _____ Oct. 8, 1940